(12) United States Patent
Eldering et al.

(10) Patent No.: US 6,820,277 B1
(45) Date of Patent: Nov. 16, 2004

(54) ADVERTISING MANAGEMENT SYSTEM FOR DIGITAL VIDEO STREAMS

(75) Inventors: Charles A. Eldering, Doylestown, PA (US); Gregory C. Flickinger, Horsham, PA (US); Jeffrey S. Hamilton, Doylestown, PA (US)

(73) Assignee: Expanse Networks, Inc., Pipersville, PA (US)

( * ) Notice: Subject to any disclaimer, the term of this patent is extended or adjusted under 35 U.S.C. 154(b) by 0 days.

(21) Appl. No.: 09/553,637

(22) Filed: Apr. 20, 2000

Related U.S. Application Data

(60) Provisional application No. 60/183,411, filed on Feb. 18, 2000, and provisional application No. 60/130,102, filed on Apr. 20, 1999.

(51) Int. Cl.[7] .................. H04W 7/025; H04W 7/10
(52) U.S. Cl. ..................... 725/35; 725/32; 725/34; 725/36
(58) Field of Search ............... 725/14, 32, 34–36, 725/42, 46, 52; 705/26

(56) References Cited

U.S. PATENT DOCUMENTS

| | | | |
|---|---|---|---|
| 4,602,279 A | 7/1986 | Freeman | 358/86 |
| 5,099,319 A | 3/1992 | Esch et al. | 358/86 |
| 5,231,494 A | 7/1993 | Wachob | 358/146 |
| 5,446,919 A | 8/1995 | Wilkins | 455/6.2 |
| 5,532,735 A | 7/1996 | Blahut et al. | 348/13 |

(List continued on next page.)

FOREIGN PATENT DOCUMENTS

| | | |
|---|---|---|
| WO | 9712486 | 4/1997 |
| WO | 9717774 | 5/1997 |
| WO | 9741673 | 11/1997 |
| WO | 9821877 | 5/1998 |
| WO | 9828906 | 7/1998 |
| WO | 9901984 | 1/1999 |
| WO | 9904561 | 1/1999 |
| WO | 9952285 | 10/1999 |
| WO | 0008802 | 2/2000 |
| WO | 0014951 | 3/2000 |
| WO | 0033224 | 6/2000 |
| WO | 0054504 | 9/2000 |

OTHER PUBLICATIONS

SCTE Digital Video Subcommittee, Digital Program Insertion Ad Hoc Group, *Business and Operational Dependencies*, Nov. 5, 1997, 2 pages.
SCTE Digital Video Subcommittee, *Digital Program Insertion Comments from CableLabs*, Sep. 18, 1997, 2 pages.
Davis, Joe Digital Video Systems, *New Media Division, Recommendations for New Ad Hoc Group*, Sep. 16, 1997, 4 pages.
SCTE Digital Video Subcommittee, *Digital Program Insertion Requirements*, Mar. 17, 1997, 1 page.
Digital Video Systems, *Technical Issues* Nov. 5, 1997, 5 pages.
Shen, Paul Imedia Corporation, *Imedia CherryPicker™, Router Re–Multiplexer™ for Digital Programming* Jun., 1998, 12 pages.

*Primary Examiner*—Vivek Srivastava
*Assistant Examiner*—Matthew Demicco
(74) *Attorney, Agent, or Firm*—Douglas J Ryder; Ryder IP Law, PC

(57) ABSTRACT

An Ad Management System (AMS) for managing sales and insertion of targeted advertisements into advertising opportunities ("avails"). The AMS provides advertisers an ability to describe their advertisements (ad characteristics) in terms of target market demographics, required ad bandwidth, ad duration, and other ad specific parameters. The AMS receives the ad characteristics and matches the ads to the avails. The AMS tracks different avails including duration and bandwidth of the avail, and uses a number of schemes to determine if the ad can be placed in the avail. The AMS targets advertisements by correlating subscriber characteristics to the ad characteristics. The subscriber characteristics may be associated with groups of subscribers (e.g. nodes in cable television environments) or to individual subscribers.

1 Claim, 12 Drawing Sheets

U.S. PATENT DOCUMENTS

| | | | |
|---|---|---|---|
| 5,559,549 A | 9/1996 | Hendricks et al. | 348/6 |
| 5,600,364 A | 2/1997 | Hendricks et al. | 348/1 |
| 5,604,542 A | 2/1997 | Dedrick | 348/552 |
| 5,661,516 A | 8/1997 | Carles | 348/8 |
| 5,724,521 A | 3/1998 | Dedrick | 395/226 |
| 5,758,257 A | 5/1998 | Herz et al. | 455/2 |
| 5,761,601 A | 6/1998 | Nemirofsky et al. | 455/3.1 |
| 5,774,170 A | 6/1998 | Hite et al. | 348/9 |
| 5,912,696 A | 6/1999 | Buehl | 348/5.5 |
| 5,918,014 A | 6/1999 | Robinson | 395/200.49 |
| 5,933,811 A | 8/1999 | Angles et al. | 705/14 |
| 5,948,061 A | 9/1999 | Merriman et al. | 709/219 |
| 5,974,396 A | 10/1999 | Anderson et al. | 705/10 |
| 6,006,257 A | 12/1999 | Slezak | 709/219 |
| 6,009,409 A | 12/1999 | Adler et al. | 705/14 |
| 6,009,410 A | 12/1999 | LeMole et al. | 705/14 |
| 6,020,883 A | 2/2000 | Herz et al. | 345/327 |
| 6,038,591 A | 3/2000 | Wolfe et al. | 709/206 |
| 6,088,722 A | 7/2000 | Herz et al. | 709/217 |
| 6,108,637 A | 8/2000 | Blumenau | 705/7 |
| 6,134,532 A | 10/2000 | Lazarus et al. | 705/14 |
| 6,160,989 A | 12/2000 | Hendricks et al. | 455/4.2 |
| 6,177,931 B1 | 1/2001 | Alexander et al. | 345/327 |
| 6,324,519 B1 * | 11/2001 | Eldering | 705/14 |
| 6,463,585 B1 * | 10/2002 | Hendricks et al. | 725/35 |
| 6,470,079 B1 * | 10/2002 | Benson | 379/114.13 |
| 6,487,721 B1 | 11/2002 | Safadi | 725/36 |

* cited by examiner

| ZIP CODE | MEDIAN HOME PRICE |
|---|---|
| 18901 | $175,000 |
| 18910 | $64,000 |
| 18911 | $80,000 |
| 18912 | $110,000 |
| ⋮ | ⋮ |
| 18920 | $225,000 |

*FIG. 2A*

STARTER HOME PRICES

| ZIP CODE | TOWN | AVERAGE SALE |
|---|---|---|
| 02108 | BOSTON | $204,889 |
| 02158 | NEWTON, MA | 325,378 |
| 10011 | NEW YORK | 422,500 |
| 10128 | NEW YORK | 387,800 |
| 19044 | HORSHAM, PA | 151,411 |
| 19106 | PHILADELPHIA | 184,562 |
| 20007 | WASHINGTON, D.C. | 337,402 |
| 22301 | ALEXANDRIA, VA | 263,323 |
| 27613 | RALEIGH, NC | 190,863 |
| 30033 | DECATUR, GA | 169,271 |
| 30342 | ATLANTA | 318,602 |
| 33186 | MIAMI | 121,568 |
| 33647 | TAMPA, FL | 186,794 |
| 37221 | BELLEVUE, TN | 155,399 |
| 48335 | FARMINGTON, MI | 208,558 |
| 60611 | CHICAGO | 234,124 |
| 60614 | CHICAGO | 327,601 |
| 80015 | AURORA, CO | 176,517 |
| 85044 | PHOENIX | 205,099 |
| 90278 | REDONDO BEACH, CA | 329,251 |
| 91306 | WINNETKA, CA | 164,000 |
| 92117 | SAN DIEGO | 201,620 |
| 94066 | SAN BRUNO, CA | 255,110 |
| 94131 | SAN FRANCISCO | 418,731 |
| 98033 | KIRKLAND, WA | 260,334 |

*FIG. 2B*

| SUBSCRIBER | ADDRESS | TAX PARCEL # | ASSESED VALUE |
|---|---|---|---|
| JOHN & MARY JONES | 12 EUCLID | 96-2-112 | $115,000 |
| JANE DOE | 1550 12TH | 96-3-115 | $350,000 |
| ... | | | |
| TOM & SHEENA SMITH | 1512 20TH | 96-3-130 | $64,000 |

*FIG. 3*

ADVERTISEMENT: VOLKSWAGEN, DRIVERS WANTED

DURATION: 30s

MINIMUM BW: 4Mb/s

| AVAIL | DATE/TIME | PROGRAM | CORRELATION |
|---|---|---|---|
| #23 | 3MARCH00 : 15:28 | DAYS OF OUR LIVES | 0.2 |
| #72 | 3MARCH00 : 20:15 | BUFFY THE VAMPIRE SLAYER | 0.7 |
| #51 | 3MARCH00 : 21:00 | 60 MINUTES | 0.6 |

*FIG. 6*

ADVERTISEMENT: VOLKSWAGEN, DRIVERS WANTED
DURATION: 30s
MINIMUM BW: 4Mb/s

CORRELATION W/ NODE/SUBSCRIBER

HOUSEHOLD INCOME 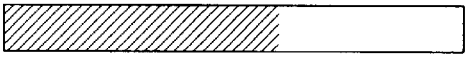 0.6

HOUSEHOLD SIZE  0.7

MEDIAN HOUSEHOLD AGE  0.4

ETHNIC GROUP 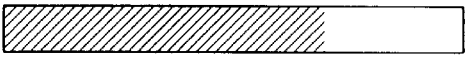 0.7

AVERAGE DEMOGRAPHIC CORRELATION  0.6

CORRELATION W/ AVAIL

VIEWER'S INCOME  0.8

VIEWER'S HOUSEHOLD SIZE  0.6

VIEWER'S AGE 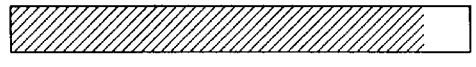 0.9

VIEWER'S ETHNIC GROUP 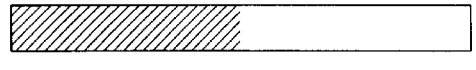 0.5

AVERAGE AVAIL CORRELATION  0.7

EXPECTED VIEWERSHIP: 2E6
ACTUAL VIEWERSHIP: 1.8E6

*FIG. 7*

| AVAIL# | DATE/TIME | PROGRAM | AD# | AD TITLE | CORRELATION | VIEWERSHIP | IMPACT | PRICE |
|---|---|---|---|---|---|---|---|---|
| #23 | 3MARCH00:15:28 | DAYS OF OUR LIVES | AD757 | IVORY SOAP | 0.6 | 3.2E6 | 1.92E6 | $72,000 |
| #75 | 3MARCH00:18:10 | 6:00 NEWS | AD3021 | FORD | 0.7 | 1.8E6 | 1.26E6 | $42,000 |
| #51 | 3MARCH00:21:00 | 60 MINUTES | AD312 | VOLKSWAGEN: DRIVERS WANTED | 0.8 | 2.5E6 | 2E6 | $100,000 |

*FIG. 8*

ADVERTISING MANAGEMENT SYSTEM FOR DIGITAL VIDEO STREAMS

This application claims the priority, under 35 U.S.C. §119(e), of Provisional Applications 60/130,102 filed on Apr. 20, 1999 and 60/183,411 filed on Feb. 18, 2000. Both of these applications are herein incorporated by reference but are not admitted to be prior art.

BACKGROUND OF THE INVENTION

Advertising forms an important part of broadcast programming including broadcast video (television), radio and printed media. The revenues generated from advertisers subsidize and in some cases pay-entirely for programming received by subscribers. For example, over the air broadcast programming (non-cable television) is provided entirely free to viewers and is essentially paid for by the advertisements placed in the shows that are watched. Even in cable television systems and satellite-based systems, the revenues from advertisements subsidize the cost of the programming, and were it not for advertisements, the monthly subscription rates for cable television would be many times higher than at present. Radio similarly offers free programming based on payments for advertising. The low cost of newspapers and magazines is based on the subsidization of the cost of reporting, printing and distribution from the advertising revenues.

Techniques for inserting pre-recorded spot messages into broadcast transmission have been known. Generally, broadcast video sources (i.e., TV networks, special interest channels, etc.) schedule their air time with two types of information: "programming" for the purpose of informing or entertaining, and "avails" for the purpose of advertising. The avails may occupy roughly 20–25% of the total transmitting time, and are usually divided into smaller intervals of 15, 30, or 60 seconds.

In many prior art systems, the insertion of advertisements in avails is handled by a combination of cue-tone detectors, switching equipment and tape players which hold the advertising material. Upon receipt of the cue tones, an insertion controller automatically turns on a tape player containing the advertisement. Switching equipment then switches the system output from the video and audio signals received from the programming source to the output of the tape player. The tape player remains on for the duration of the advertising, after which the insertion controller causes the switching equipment to switch back to the video and audio channels of the programming source. When switched, these successive program and advertising segments usually feed to a radio-frequency (RF) modulator for delivery to the subscribers.

Many subscriber television systems, such as cable television are currently being converted to digital equipment. These new digital systems compress the advertising data according to a decompression standards, such as a Motion Picture Experts Group (MPEG) compression standard (currently MPEG-2 standard). The compressed data is then stored as a digital file on a large disk drive (or several drives). Upon receipt of the cue tone, the digital file is spooled ("played") off of the drive to a decompressor. The video and accompanying audio data are decompressed back to standard video and audio, and switched into the video/audio feed of the RF modulator for delivery to the subscriber.

A prior art (present model) of providing advertisements along with actual programming is based on linked sponsorship. In the linked sponsorship model, the advertisements are inserted into the actual programming based on the demographic information related to the viewers/subscribers. However, the ability to transmit information digitally allows programming and advertisements to be transported from various geographic locations and arranged in a fashion which permits an optimized program to be presented to a subscriber.

The transition to the digital age permits a migration to new methods of advertising based on what is termed orthogonal sponsorship. In orthogonal sponsorship, the advertisements are targeted at subscribers based on a determination that the advertisement will be of interest to the subscriber and that the subscriber is likely to ultimately purchase the product or service being advertised.

The digital systems are capable of handling both linked sponsorship, orthogonal sponsorship and a combination of both. However, what is required is a method and apparatus for identifying advertising opportunities, presenting those opportunities to advertisers, receiving information about the advertisements, determining the ability to insert the advertisements, managing the insertion process, and returning to the program in the digital video arena.

SUMMARY OF THE INVENTION

The present invention is a method and apparatus for the managing advertisements in a digital environment, including methods for selecting suitable advertising based on subscriber profiles, and substituting advertisements in a program stream with targeted advertisements.

The Ad Management System (AMS) of the present invention manages the sales and insertion of digital video advertisements (hereinafter "ads") in telecommunications systems, such as cable television (CATV), switched digital video (SDV), and streaming video (Internet) based environments. The AMS provides advertisers an ability to describe their advertisements in terms of target market demographics, required ad bandwidth, ad duration, and other ad specific parameters.

The AMS receives the ad descriptions that include some or all of the aforementioned parameters, and matches the ads to the advertising opportunities ("avails") available in the programming stream. The AMS tracks different avails including duration and bandwidth of the avail, and uses a number of schemes to determine if the ad can be placed in the avail. In one embodiment, the ads are received in a high resolution state with minimum compression, and are compressed to a predetermined available bit rate (ABR) bandwidth.

One of the key functions of the AMS is its ability to allow ads to be matched to groups of subscribers (e.g. nodes in CATV environments) or to individual subscribers in the SDV or streaming video environments. The service is provided at no cost to the subscriber/consumer, however, the economic efficiencies are created and may be used to provide a revenue stream to the cable operator, profiler and ad service operator.

Another key aspect of the present invention is one or more privacy features wherein the raw consumer/subscriber data is maintained private on a Secured Correlation Server (SCS). The raw consumer/subscriber data is not available for sale or is not accessible by third parties. Thus, the AMS forms part of a matching service, in which advertisers work in conjunction with subscribers, profilers (such as video surfstream profilers, Internet profilers, and retail outlets), and network operators to allow subscribers to receive more targeted ads while protecting the privacy of the subscribers.

The network operator may be a cable, Digital Subscriber Line (DSL), or satellite network operator. Subscribers receive the benefits of being able to have advertisements which are more targeted to their lifestyle in addition to receiving discounts from retailers and service providers.

Furthermore, a method of dynamic ad linking is presented in which a present ad in an actual programming (e.g., a primary program stream) can be replaced by another ad targeted at the subscriber. A plurality of different schemes may be used for dynamic linking, e.g., the ads may be statistically multiplexed within a program stream in real-time. Alternatively, a local storage may be used to store the ad for subsequent insertion into the program stream.

These and other features and objects of the invention will be more fully understood from the following detailed description of the preferred embodiments, which should be read in light of the accompanying drawings.

BRIEF DESCRIPTION OF THE DRAWINGS

The accompanying drawings, which are incorporated in and form a part of the specification, illustrate the embodiments of the present invention and, together with the description serve to explain the principles of the invention.

In the drawings:

FIGS. 2A and 2B illustrate exemplary use of public information based on median home prices or starter home prices;

FIG. 3 illustrates an exemplary tax assessment data that can be used for determining the applicability of an advertisement;

FIG. 6 illustrates an exemplary case of utilizing avail opportunities in conjunction with correlation data to match the advertisements;

FIG. 7 illustrates a bar graph indicator utilized for correlating advertisements and subscribers;

FIG. 8 illustrates an exemplary pricing scheme;

DETAILED DESCRIPTION OF THE PREFERRED EMBODIMENT

Figure 1:
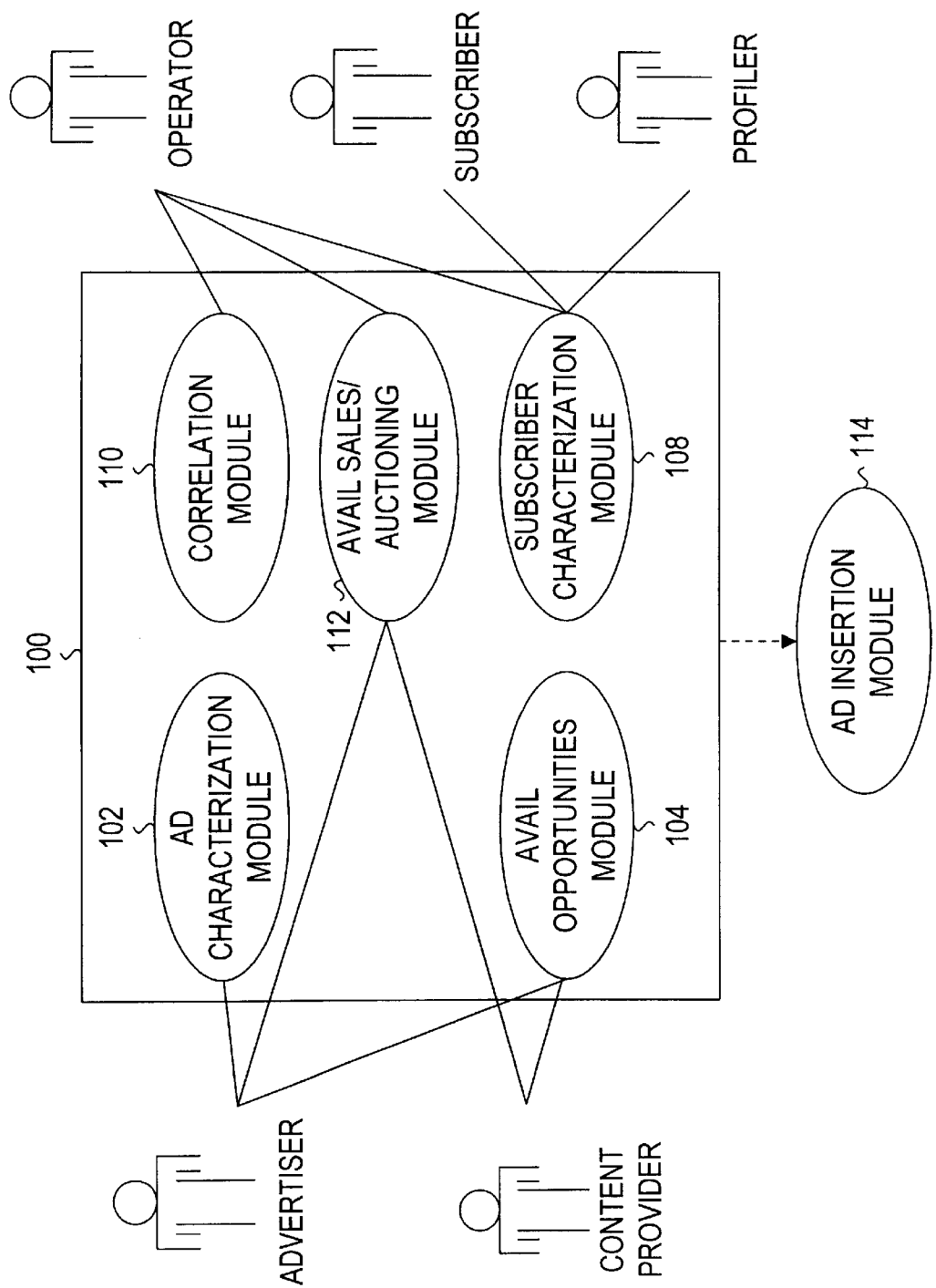
FIG. 1 illustrates an advertisement management system (AMS) in accordance with the one embodiment of the present invention.
Figure 4A:
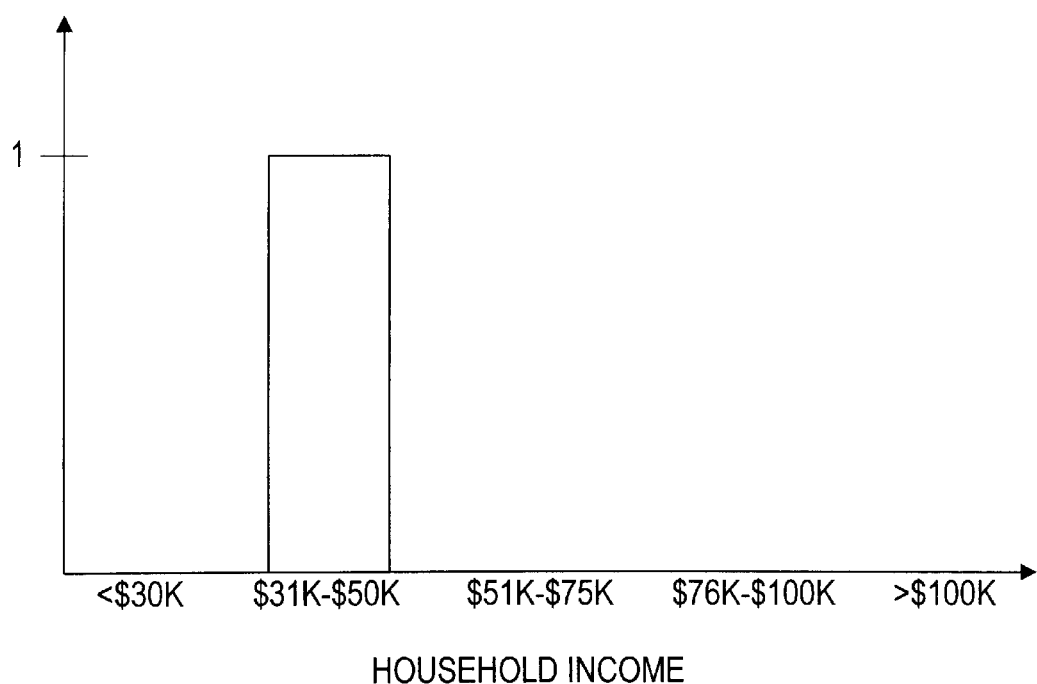
FIGS. 4A–4D illustrate exemplary graphical representation of ad characterization vectors.
Figure 4B:
Figure 4C:
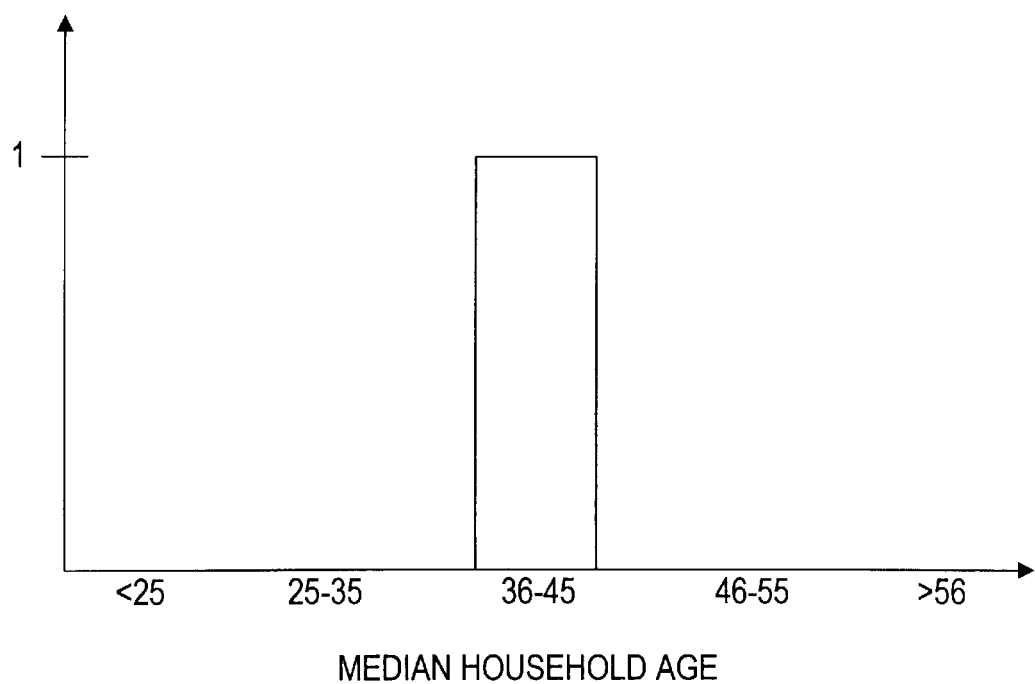
Figure 4D:
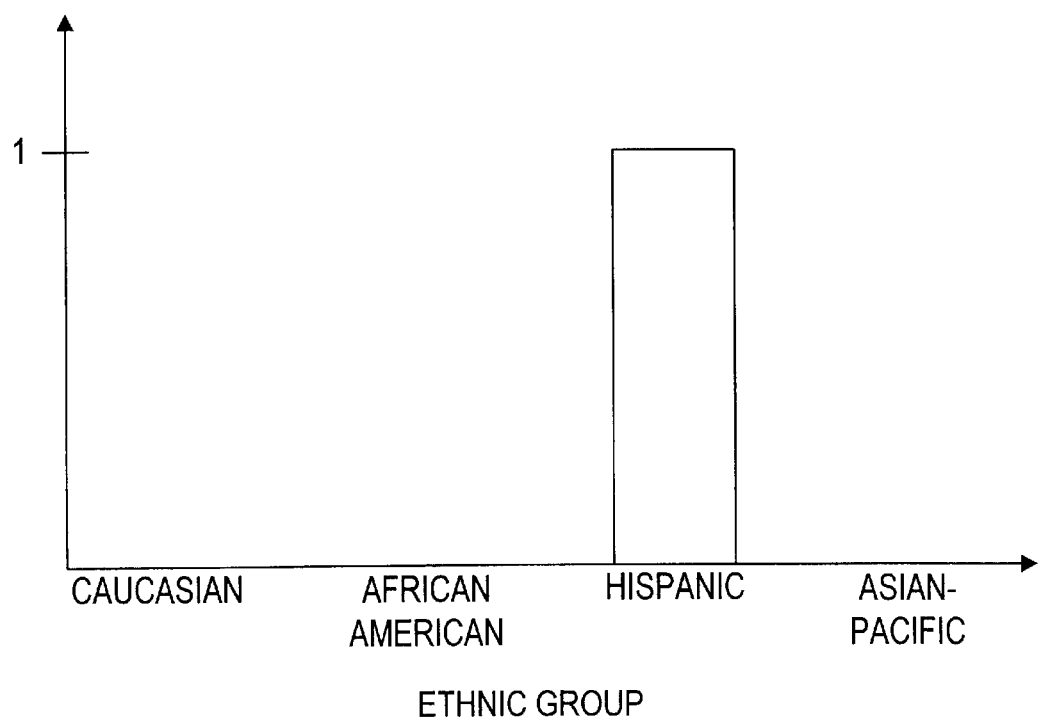

In describing a preferred embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose.

With reference to the drawings, in general, and FIGS. 1 through 10 in particular, the method and system of the present invention is disclosed.

Generally, an advertisement management system (AMS) in accordance with the principles of the present invention consists of one or more subsystems which allow for the characterization of the advertisement, determination of advertising opportunities (avails), characterization of the subscriber, correlation of the advertisement with a subscriber or group of subscribers, and sale of the advertisement, either through a traditional placement (sale), an Internet based sale, or an Internet based auction.

As illustrated in FIG. 1, an AMS 100 comprises an ad characterization module 102, an avail opportunities module 104, a subscriber characterization module 108, a correlation module 110, and an avail sales/auctioning module 112. The AMS 100 is also configured to communicate to an ad insertion module 114. The ad insertion module 114 may be located within the AMS 100 or may be located externally.

The ad characterization module 102 allows one or more advertisers to enter key characterization data regarding the advertisement and the target market. The avail opportunities module 104 allows the content providers/producers of program streams to indicate various avails that are available in the programming stream, their basic characteristics, and the extent to which they can be substituted. The subscriber characterization module 108 allows for the collection of subscriber data. The subscriber data can be collected from a variety of sources including private databases external to the system or public databases that contain information relevant to the subscriber.

With respect to private data, the subscriber has generally paid for the access to this data, e.g., the subscriber may receive product promotions or other offers. The subscriber is also provided access to his private data. The subscriber may access the private data to assure the integrity of the data, e.g., the data accurately reflects his interests and lifestyle.

The subscriber data may be based on an individual subscriber, a group of subscribers, a household or a group of households. Techniques evolving the coarse discrimination of subscribers and grouping of subscribers into large groups can be used to associate a serving area with a particular advertisement. For example, in a cable television (CATV) system, it may be determined that a group of subscribers associated with a particular optical distribution node speak a particular language. This knowledge may then be used to direct a particular set of advertisements to that node. As an example, a node associated with Spanish-speaking individuals can have advertisements in Spanish inserted in the programming streams.

The specific targeting can also be based on public information such has median home prices or starter home prices. These prices can be further associated with zip codes, as shown in FIGS. 2A and 2B. The publicly available data may be subscriber specific. FIG. 3 illustrates an example of tax assessment data that can be used as a factor in determining the applicability of an advertisement. In the case of tax assessment data, the subscriber's name, address and tax parcel number are known along with an assessed value of the property. The assessed value of the property can be used to determine an approximate income range for the family and thus specifically target advertisements.

The publicly available data is not restricted to real estate data, as illustrated in FIGS. 2 and 3, but can include a variety of demographic data including median household age, household income, race and other characteristics which can be determined on a group or individual level.

Private data can also be amassed and can include specific viewing habits or purchase records of the subscriber. Alternatively, the subscriber may complete questionnaires and forms that indicate lifestyle, product preference and previous purchases. All the available private and public information is used by the subscriber characterization module 108 for characterizing one or more subscribers. The subscriber characteristics may be based upon some known features. For example, it is known that the Nielsen data tracks the number of households watching particular TV programming. In accordance with the principles of the present invention, such information may be used to characterize one or more characteristics of the subscribers.

The ad characterization module 102 has an advertiser interface, e.g., a Web (browser) interface, that allows advertisers to enter parameters which characterize their advertisement and are used to form ad characterization vectors. The advertisers may manually create ad characterization vectors by entering useful information via the browser interface. In this case, the ad characterization vector contains a simple deterministic value (0or 1) for each category. Alternatively, the vectors may contain probabilistic distributions and may allow advertisers to develop more complex models for the target market. The principles of the present invention are flexible and may operate with either simple deterministic values or with complex models. Furthermore, heuristic rules may be defined for generating ad characterization vectors. These heuristic rules are logical rules or conditional probabilities that aid in the formation of adcharacterization vectors. The heuristic rules in logic form allow the system to apply generalizations that have been learned from external studies. In the case of conditional probabilities, determinations are based on statistical probabilities that define ad characterization vectors.

Furthermore, the ad characterization module 102 supports entry of the one or more parameters that are used by advertisers to target the advertisement and create advertisement vectors. The choices for these parameters may be presented as pull down selections in a browser utilizing a graphical user interface (GUI). In an exemplary case, the following categories may be used:

Advertisement duration: 10 s; 15 s; 30 s; 60 s

Minimum advertisement bandwidth: 2 Mb/s, 4 Mb/s, 6 Mb/s, 8 Mb/s, 10 Mb/s

Household Income: <$30 K, $31 K–$50 K, $51 K–75 K, $76 K–$100 K, >$100 K, no preference Household size: 1, 2, 3–4, 4–6, >6, no preference Median household age: <25, 25–35, 36–45, 46–55, >56, no preference Ethnic group: Caucasian, African American, Hispanic, Asian-Pacific, no preference In one implementation, when "no preference" is chosen, equal weighting is given to each category within the particular demographic parameter. For example, if no preference is selected for household income, all categories within the household income demographic are assigned a value of 0.2 (1 divided by the number of choices, which in this case is 5). After weights have been assigned to all the categories, one or more ad characterization vectors may be generated based on weighted categories. These ad characterization vectors assist in characterization of various advertisements. An exemplary graphical representation of these vectors is presented in FIGS. 4A–4D. Other categories based on demographic factors, socio-economic factors, and consumption factors (purchase information) may also be used.

The avail opportunities module 104 permits an operator or a video programming manager an ability to list and organize the particular avails in a programming stream. The avail opportunities module 104 comprises an interface that may be used for manual entry of data, or may be used for collection of avail data from network or other content related databases. The avail data may include specifics about the avail opportunities, such as duration, broadcast time, etc. and may include demographic data pertaining to the program the avail is associated with, such as household income, ethnic group, etc. The avail data may be used for formation of one or more avail characterization vectors. These avail characterization vectors are correlated with the ad characterization vectors to determine how avails should be correlated with the ads. The result of this correlation (avail correlation) is an enhanced measurement of how well the correlation exists between an ad and an avail. One or more heuristic rules may be defined for the generation avail characterization vectors. These heuristic rules may be expressed in terms of logical rules as well as conditional probabilities.

In an exemplary case, the avail opportunities module 104 may have a GUI and the operator may be presented with the following menus to assist in generation of the avail information:

Programming opportunity: fill-in line regarding the programming in which the avail is located (e.g. Buffy the Vampire Slayer, or Monday Night Football)

Avail duration: the exact time duration of the avail (e.g. 30 s)

Initial bandwidth: the minimum bandwidth which is given to the avail, and to which the initial advertisement is maximally compressed. As an example, if an advertisement is initially placed in a program stream which is compressed to 6 Mb/s, the initial bandwidth of the avail is 6 Mb/s.

Initial scheduled broadcast time: the initial date/time (Universal Standard Time, UST) at which the avail will appear.

Local preemption authorized: this checkbox indicates if an avail can be substituted at the local level or if such substitution is prohibited.

Household Income: <$30 K, $31 K–$50 K, $51 K–75 K, $76 K–$100 K, >$100 K, not designated Household size: 1, 2, 3–4, 4–6, >6, not designated Median household age: <25, 25–35, 36–45, 46–55, >56, not designated Ethnic group: Caucasian, African American, Hispanic, Asian-Pacific, not designated The subscriber characterization module 108 provides the operator the ability to characterize the subscriber in Switched Digital Video (SDV) mode or in non-SDV mode. The characterizations of the subscriber are used to form a subscriber characterization vector.

In a non-SDV mode, the operator is presented with a node demographics interface that allows the operator to manually program the node characteristics using pull-down menus, or to import the data from a file. The node characteristics are determined from information manually collected by the operator, or assembled using agents that collect the information from publicly available sources. The node demographics interface presents both an input screen and a node characteristics screen, wherein the node characteristics screen further includes a graphical representation of the node demographics. Generally, a browser-based interface allows the operator to analyze the input characteristics, and to characterize the node. The characteristics that are input and displayed include the following:

Household Income: <$30 K, $31 K–$50 K, $51 K–75 K, $76 K–$100 K, >$100 K

Household size: 1, 2, 3–4, 4–6, >6

Median household age: <25, 25–35, 36–45, 46–55, >56

Ethnic group: Caucasian, African American, Hispanic, Asian-Pacific

The browser-based interface also permits the subscriber characterization module 108 to fill in probabilistic values for each of the parameters. A pull down menu may be utilized with increments of 0.1, and a normalization error message may be generated if the operator generates a series of values which when summed exceed one. If the operator enters values that do not sum to 1.0, another normalization error message may be generated-and displayed. As an example, if the operator characterizes the node as having equal probability of the household income being in any one of the ranges shown above, the value that must be entered in each category is 0.2.

In an SDV mode, the operator is presented with a subscriber information interface. By utilizing this interface, the system is capable of retrieving (based on a unique subscriber ID) demographic and product preference characteristics for each subscriber/household. Generally, to protect privacy, the subscriber private information is not used in the subscriber ID, therefore the subscriber is not identifiable by the ID. The demographic and product preference characteristics may be stored locally or may be stored in one or more network databases configured to directly communicate with the AMS 100.

In an exemplary case, information for a limited number of subscribers may be stored and may be retrievable and displayable on the interface. The principal characteristics of the displayed subscriber information include:

Household Income: <$30 K, $31 K–$50 K, $51 K–75 K, $76 K–$100 K, >$100 K

Household size: 1, 2, 3–4, 4–6, >6

Median household age: <25, 25–35, 36–45, 46–55, >56

Ethnic group: Caucasian, African American, Hispanic, Asian-Pacific

The subscriber characteristics may be determined in a plurality of ways including by utilizing previously described public and private data. These characteristics may also be determined based on probabilistic measures in an external surfstream characterization module (not shown). The surfstream characterization module monitors the subscriber viewing habits and determines subscriber preferences by utilizing one or more pre-determined heuristic rules.

The correlation module 110 correlates the ad characterization vectors with the subscriber/node characterization vectors to produce a demographic correlation, and also correlates the ad characterization vectors with the avail characterization vectors to produce an avail correlation. The correlation values may be calculated for each ad characterization vector and the corresponding subscriber/node characterization vector, as well as for each ad characterization vector and the avail characterization vectors. In one implementation, the correlations are generated by multiplying corresponding elements of the vector and summing the result (dot product). Different correlation values are normalized such that the resulting correlation value is normalized to 1, with a value of 1 indicating that the maximum correlation has been obtained.

Figure 5:
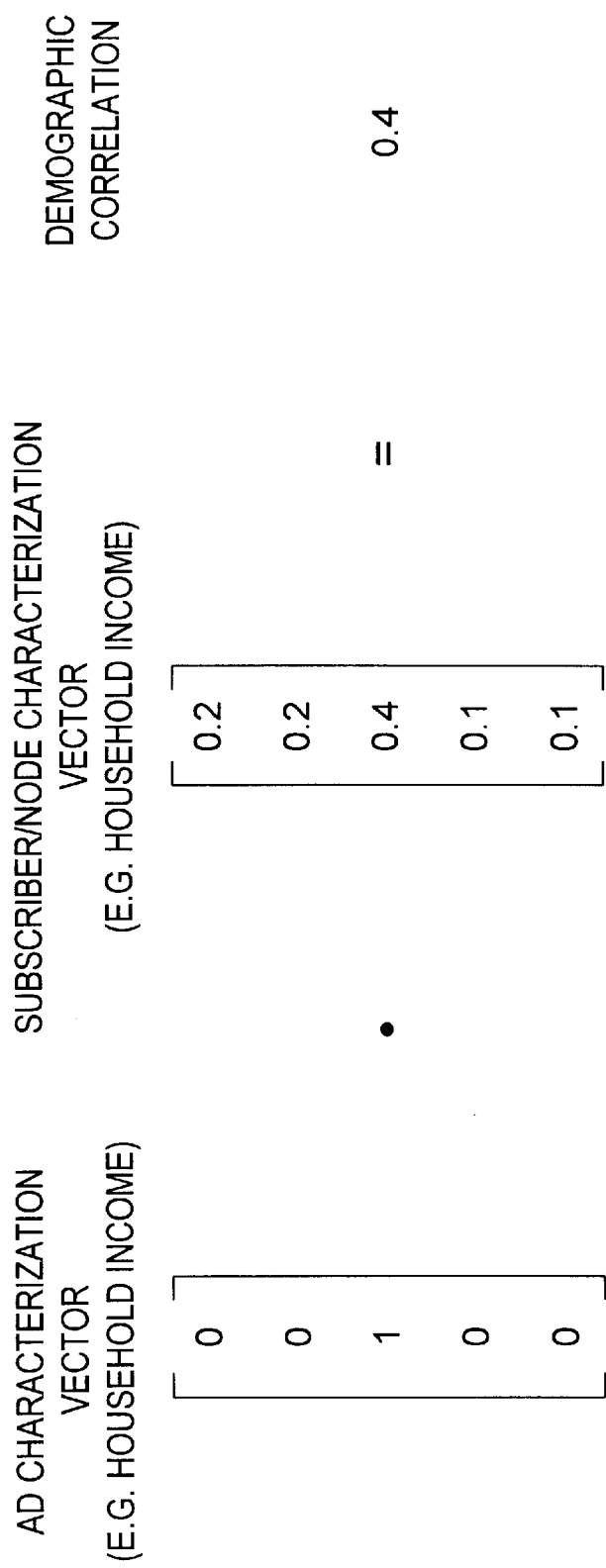
FIG. 5 illustrates an exemplary case of demographic correlation.

An exemplary case of a demographic correlation is illustrated in FIG. 5. The calculation for the avail correlation may be performed similarly. The average value (sum of correlations divided by 2) of the demographic and avail correlations may be calculated to produce an average correlation which is simply known as the "combined correlation." An impact value may also be calculated which is generally equal to the number of subscribers (estimated viewership) multiplied by the combined correlation value.

The avail sales/auctioning module 112 utilizes information regarding the avail opportunities in conjunction with the results of the correlation to match advertisements with avails and to complete the transaction. Generally, the avail sales/auctioning module 112 collects information about all avails matching the basic time duration and bandwidth characteristics, along with the program they are presently linked to, and the combined correlation between the advertisement and the avail listed. FIG. 6 illustrates such information in a tabular form.

Based on the collected information, the avail sales/auctioning module 112 displays, in a graphical representation, correlations between a proposed advertisement and the various subscribers. FIG. 7 illustrates this information as a bar graph and numeric indicator.

The avail sales/auctioning module 112 also calculates the placement of the advertisements based on the degree of correlation and a pricing scheme as described below. An exemplary case is illustrated in FIG. 8. In this example, a simple pricing scheme is utilized in which the price for placement of the advertisement depends linearly on the correlation. Also, the degree of correlation may be used to offer discounts on the pricing. Higher correlation means lower discounts to the advertisers, e.g., a correlation of 0.9 results in a 0% discount, and a correlation of 0.2 results in a 30% discount of the listed price.

The pricing scheme may further be utilized for the sale of avails by ranking the correlations of the avails and the ads in decreasing order as a function of the degree of correlation. When multiple ads are used with an avail, the ad with the highest correlation (and its corresponding price) is selected for placement in the avail. If multiple ads indicate the same degree of correlation, the first ad in the list is selected for placement in the avail. Furthermore, the revenues may be optimized by announcing avails to more than one advertiser, or by auctioning available avails to various advertisers or ad sources.

Figure 9:
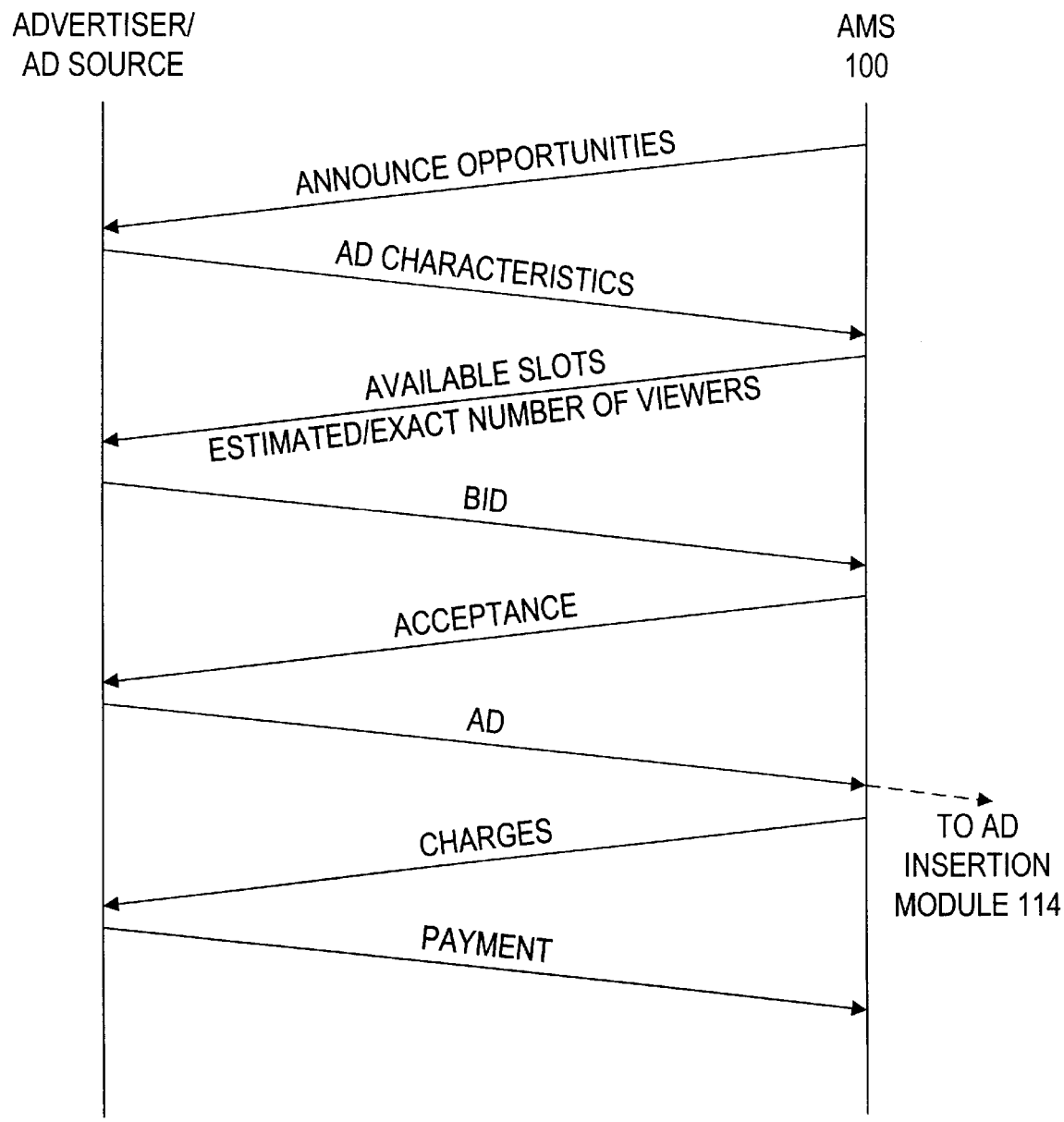
FIG. 9 is a functional diagram showing different functions of avail sales/auctioning module.

FIG. 9 illustrates an exemplary case wherein the avail sales/auctioning module 112 announces the avail opportunities to various advertisers and ad sources. This announcement may be made via the Internet. Advertisers/ad sources receive the announcement and respond with one or more ad characteristics that include information regarding the product/service advertised, target market characteristics, target programs, duration of the advertisement, and minimum bandwidth required to transmit the advertisement.

Based on the received ad characteristics, the AMS 100 determines the characteristics of available slots, including an estimated or exact number of viewers. The AMS 100 may report a real time report on the viewing audience (i.e., the number of viewers at that time). In CATV, the number of active viewers can be reported back to the AMS 100 (in real time) by the use of a return path data modem in the set-top. In SDV systems, such as those based on Digital Subscriber Line (xDSL), Fiber-To-The-Curb (FTTC), and Fiber-To-The-Home (FTTH) transmission technologies, the selection of the video programming occurs at the central office, and it is possible for the system to determine the number of active viewers of a program at any given moment.

In an alternative implementation, the exact number of viewers are not determined and statistical information such as Neilsen data is reported to the advertisers. The statistical data can be updated relatively frequently, such that the reports received by the advertisers are based on monthly, weekly, or even daily determinations of the approximate number of viewers of a program.

Once information regarding the advertising opportunities has been transmitted to the advertisers/ad sources, the advertisers/ad sources may submit appropriate bid/bids for the advertisement. The avail sales/auctioning module 112 receives the bids, and after evaluation either accepts the bids or declines the bids. Multiple rounds of bidding may be utilized to insure that the highest price for the advertisement is received by the AMS 100.

Once the bidding process is complete, the avail sales/auctioning module 112 transmits an acceptance notification to the requesting advertiser/ad source. The advertiser/ad source then transmits the actual contents of the advertisement. The contents are then placed in a suitable format and sent to the ad insertion module 114 for insertion into the actual program streams (set of program signals). These program streams may be Internet web traffic or television programming.

The ad may be multiplexed in a program stream (synchronously or asynchronously), or may be carried as an in-band, or and out-of-band advertisement channel. In either case, a dynamic linking process is used to insert the advertisements in the program streams.

Figure 10:
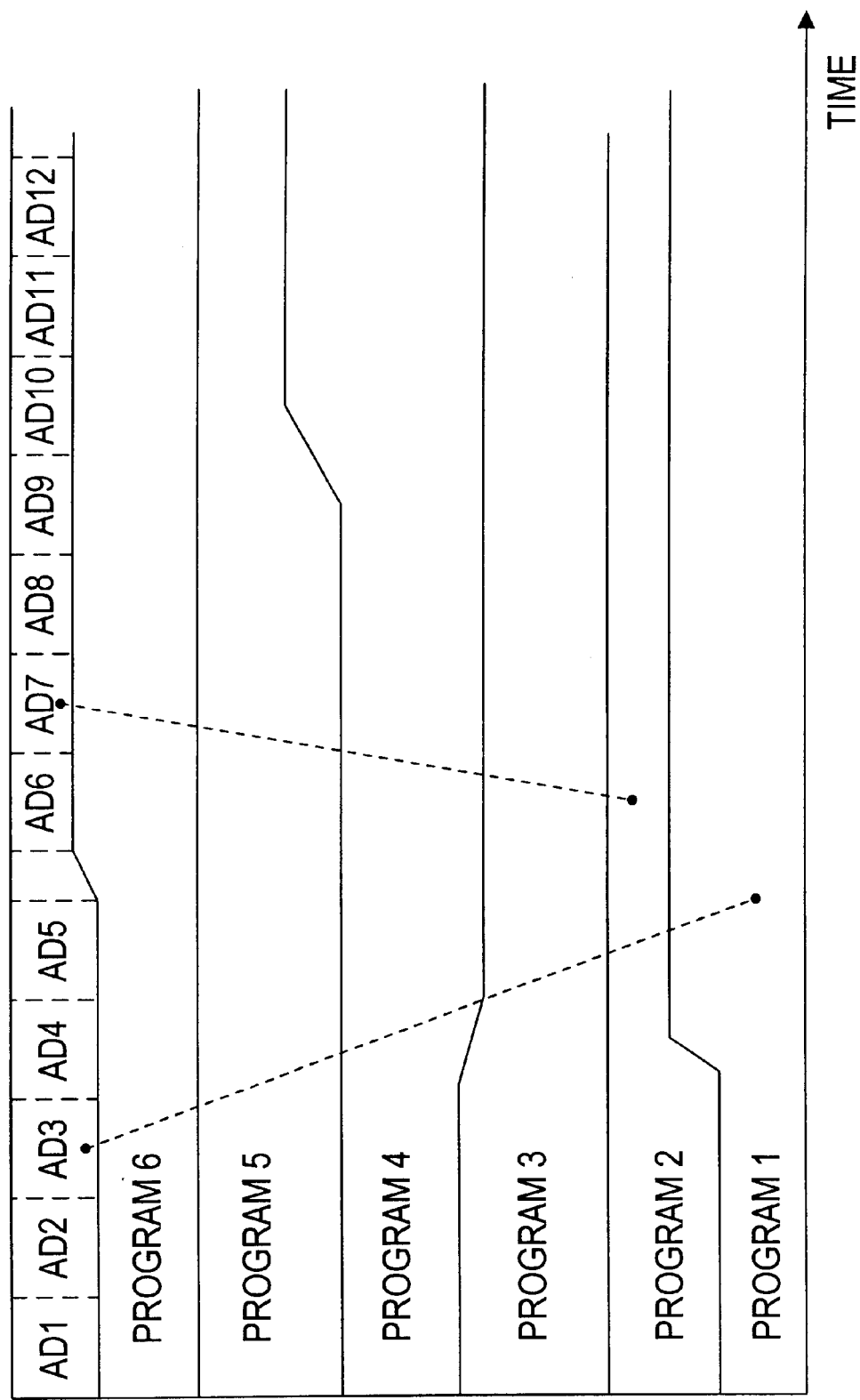
FIG. 10 illustrates an exemplary method of dynamic ad linking.

FIG. 10 illustrates the method of dynamic ad linking. In dynamic ad linking, one or more advertisements from an ad stream not initially associated with a program stream can be inserted into that program stream for viewing by the subscriber. As illustrated in FIG. 10, six different program streams are multiplexed together, and the advertisements (AD1–AD12) are carried on a separate channel. In the dynamic linking process, the advertisements are not pre-assigned to any program streams and are instead dynamically linked based on the correlation results. For example, program stream 1 can have AD3 inserted into the stream in real-time and be viewed by the subscriber.

Similarly, program stream 2 may have ad AD7 dynamically associated with the program stream. The remaining of the program streams may be assigned either of the advertisements. The advantage of the dynamic linking technique is that ads contained with a multiplexed stream can be selected and directed to a viewer. Advertisements are no longer limited to the ads initially associated with program stream.

The dynamic linking may be employed in a CATV system in which a number of programs are multiplexed into a 27 Mbps data stream. The advertisements may be dynamically linked to the program streams simply by re-addressing one or more identifiers associated with the advertisements at the time of synchronous ad insertion. For synchronous systems, dynamic linking at the commencement of the advertisement occurs when an ad to be selected from the program stream is inserted into another program stream. As an example, a viewer of program 1 can have an ad from ad stream AD7 directed at the time of commencement of the advertisement.

Although the dynamic linking method has been described with respect to a cable television system and the multiplexed stream within a 6 MHz channel, its use is not limited to cable systems but can be equally applied to other broadcast systems or switched digital systems which transmit two or more programs.

Once the ad has been inserted in a program stream by the ad insertion module 114, the ad is transmitted to the subscriber along with the actual program stream for viewing. Once the advertisement has been transmitted, the associated charges are billed to the advertiser that in turn submits a payment. A billing module (not shown) may be added to handle the charges and the payments. In one embodiment, the charges and payment are transmitted electronically over the Internet. In an alternate embodiment, traditional methods of notification and payment (e.g. notification of charges via invoices and payment via check) may be used.

In a preferred embodiment, the AMS 100 is implemented on server based technology. As an example, processors provided by Intel under the trademark PENTIUM can be used in a single processor or multiple processor configuration. The operating system offered by Microsoft Corporation under the trademark WINDOWS NT SERVER can be used as the basis for the platform. The AMS 100 can be realized in a software means in a number of programming languages including but not limited to Java, C, and C++. In one embodiment the portions of the system which interface to the Internet are based on Java and Java scripts.

The communications with advertisers can take place by executing one or more Java scripts which exchange information between the AMS 100 and the advertisers. The operations of the unit may also be realized in C language.

At the subscriber side, the programming and the target advertisements are received by a television, television set-top, or personal computer that decodes the multiplexed video programming, and displays it on a television or a monitor. The set-top can be based on a cable receiver including a microprocessor, and an MPEG video decompression device.

The program and ad signals are generally transported to the subscriber over a variety of transmission systems including cable, satellite, wireless, xDSL, FTTC or FTTH networks. At the subscriber side of the transmission system, the set-top or personal computer contains hardware for the reception of signals from the network and can include multiple tuners for receiving video programming along with advertisements, as well as one or more microprocessors and associated random access memory (RAM) which can be used for storage of ads or video programming as required by the dynamic linking ad insertion techniques. The information required to associate the ad with the programming can be transmitted from the ad manager over the same channel used to transmit the video. In one implementation, the MPEG standard allows for the transport of data, however, it is envisioned that alternate techniques are available to transmit data to the set-top.

A number of other embodiments (implementation techniques) are used to perform the dynamic advertisement linking, including but not limited to substitution of a program identifier or other identifier into the advertisement which is to be viewed, and replacing the packets containing the original advertisements with the substituted advertisement. Suitable identifiers include Virtual Path Identifier/Virtual Channel Identifier (VPI/VCI) identifiers, MPEG program IDs, or Transmission Control Protocol/Internet Protocol (TCP/IP) addresses. Methods of substituting the identifiers and multiplexing in the substitute packets containing the advertisements are well known to those skilled in the art.

In another embodiment, an interface is developed with different system operators or content providers that may provide descriptions of the avails including date/time of showing, program, and minimum bandwidth requirements. In another embodiment, an additional module termed Subscriber/Consumer Authorization Module (not shown): indicating that a subscriber has enrolled for the privacy safeguard features may be added. The subscriber/consumer authorization module is compatible with generally known billing systems to allow for the export of discount information to the billing system. The subscriber/consumer authorization module is capable of exporting records to other database systems (e.g. retail store databases) indicating the discounts consumers are eligible for based on their use of the system.

In another embodiment, the AMS 100 is configured to have the ability to receive surfstream profiles from a SDV system. These surfstream profiles will be in the form of subscriber/household characterization vectors that are identified with a unique subscriber ID. In order to protect privacy, no surfstream data is passed from the SDV system to the AMS 100.

In another embodiment, the system is configured to have the ability to utilize actual viewership information. In SDV systems, this information is readily available from the switching system, such as a Broadband Digital Terminal (BDT), which is typically located in the telephone central office, but which may also be located in the field. In traditional CATV systems, the viewership information may be collected in the television set-top by monitoring the channel to which the subscriber is tuned. This information is subsequently transmitted to the head end to provide the actual viewership information as opposed to the expected viewership. The data channel as specified in the Data Over Cable System Interface Specification (DOCSIS) can be used to transmit the viewership information to the head-end or other location.

In another embodiment, the AMS 100 includes an ability to capture particular ads (as described below) and to store those ads for later display. Generally, the ability to access advertisement databases is external to the AMS 100 and is maintained by the advertisers themselves. These databases contain advertisement characterization vectors in standardized formats. However, in this implementation, an ability to extract avail information from MPEG video streams to determine avail parameters is added within the AMS 100. In this implementation, the ability to deliver ads in concatenated insertion systems and the ability to capture ads in real time at insertion modules is also included within the AMS 100. As an example, COKE® may play a national ad on TNT® and then want to repeat it in regional or local markets. In accordance with this implementation, there is no need to capture the ad and store it on a server. Instead, the ad may be captured "on the fly" and be added in the desired program streams.

In another embodiment, the ability to selectively capture ads in each server, based on node/subscriber demographics or other Artificial Intelligence (AI) criteria is also added. In this implementation, the ads are automatically captured at a local server, and are presented for subsequent auctioning. One set of criteria that can be used is the correlation between the ad (based on an ad characterization vector, possibly transmitted with the advertisement) and the node/subscriber demographics. As an example, the ads that are targeted for high income households may be stored on local servers located in head-ends serving high income areas.

In another embodiment, the ability to receive an "ad channel" which serves as the source for ad segments is also added. The "ad channel" would be implemented as a channel on a common cable satellite, which provides cable programming and would contain a continuous or quasi-continuous stream of ads.

In another embodiment, where a rate for the advertisements is not constant over the duration of the ad, the AMS 100 specifies the rate in terms of the number of Multi Program Transport Stream (MPTS) packets per program transport stream packet. This can be done on a time linear scale holding the last value until the next value arrives.

The principles of the present invention are flexible and permit the use of additional features. Additional features include but are not limited to the ability to divide up "local ads" into nodes, and the ability to handle non-constant bandwidth advertisement profiles. These features allow for the "activation" of regional and national versions of multiple ads in a downstream inserter that modifies the program specific information (PSI) to insert the desired ad. In this implementation, the profiles that are supported include predefined avail profiles, with the bandwidth varying during the course of the avail. The bandwidth generally does not exceed a pre-determined limit.

The system as described in various ways may be represented and modeled using primarily the Unified Modified Language (UML) which is well known to those skilled in the art. The UML and other diagrams together with the accompanying text can be used to implement the AMS 100.

Although the embodiments described herein enable one of ordinary skill in the art to implement (i.e. build) the AMS 100, it in no way restricts the method of implementation. That is, the AMS 100 is capable of being implemented on a variety of hardware/software platforms with a variety of development languages, databases, communication protocols and frameworks as will be evident to those skilled in the art. Furthermore, the design represents only one set of business objects (classes) which can be coordinated to carry out the functionality and requirements of the AMS 100. Other designs comprising other sets of business classes and their coordinations could be constructed that also represent and conform to the requirements of the AMS 100 as will be evident to those skilled in the art.

Although this invention has been illustrated by reference to specific embodiments, it will be apparent to those skilled in the art that various changes and modifications may be made which clearly fall within the scope of the invention.

What is claimed is:

1. A system for inserting advertisements into video streams, wherein the advertisements are selected for insertion so as to target a specific audience, the system comprising:

a first module for determining where avails are within the video streams, wherein the first module also gathers information about the targeted audience of the video stream as avail characterization information;

a second module for gathering data related to advertisements including ad characterization information;

a third module for gathering data related to subscribers, including subscriber characterization information;

a fourth module for correlating the ad characterization information and the subscriber characterization information as a demographic correlation, wherein the fourth module also correlates the ad characterization information and the avail characterization information as a avail correlation and generates an average correlation based on the demographic correlation and the avail correlation; and a fifth module for inserting one of the advertisements into one of the avails based on the results of the fourth module.

* * * * *

UNITED STATES PATENT AND TRADEMARK OFFICE
CERTIFICATE OF CORRECTION

PATENT NO. : 6,820,277 B1
APPLICATION NO. : 09/553637
DATED : November 16, 2004
INVENTOR(S) : Charles A. Eldering et al.

It is certified that error appears in the above-identified patent and that said Letters Patent is hereby corrected as shown below:

1. Column 5, line 16, delete "(0or 1)" and replace with --(0 or 1)--;

2. Column 5, line 24, delete "adcharacterization" and replace with --ad characterization--;

3. Column 7, line 6, delete "generated-and" and replace with --generated and--;

Signed and Sealed this

Twenty-seventh Day of February, 2007

JON W. DUDAS
*Director of the United States Patent and Trademark Office*